United States Patent

Sugenoya et al.

[11] Patent Number: 5,302,469
[45] Date of Patent: Apr. 12, 1994

[54] SOFT MAGNETIC THIN FILM

[75] Inventors: Shoutatsu Sugenoya; Yuuichi Satoh, both of Toyko; Osamu Kohmoto, Okayama, all of Japan

[73] Assignee: TDK Corporation, Tokyo, Japan

[21] Appl. No.: 704,093

[22] Filed: May 22, 1991

[30] Foreign Application Priority Data

May 22, 1990 [JP] Japan .................. 2-131491

[51] Int. Cl.$^5$ .......................... G11B 5/66; H01F 1/00; B32B 9/00
[52] U.S. Cl. ................ 428/694 T; 428/611; 428/692; 428/900
[58] Field of Search ............ 428/694, 900, 692, 611, 428/694 T

[56] References Cited

U.S. PATENT DOCUMENTS

| | | | |
|---|---|---|---|
| 4,764,436 | 8/1988 | Akutsu et al. | 428/900 |
| 4,801,500 | 1/1989 | Yasunaga et al. | 428/900 |
| 4,858,049 | 8/1989 | Kobayashi et al. | 360/126 |
| 4,873,154 | 10/1989 | Yasunaga et al. | 428/900 |
| 4,921,763 | 5/1990 | Karamon | 428/900 |
| 4,923,748 | 5/1990 | Yasunaga et al. | 428/900 |
| 4,956,229 | 9/1990 | Yasunaga et al. | 428/900 |

FOREIGN PATENT DOCUMENTS

| | | |
|---|---|---|
| 2-57665 | 2/1990 | Japan . |
| 2-175618 | 7/1990 | Japan . |
| 2-199027 | 8/1990 | Japan . |

*Primary Examiner*—Paul J. Thibodeau
*Assistant Examiner*—Leszek Kiliman
*Attorney, Agent, or Firm*—Oblon, Spivak, McClelland, Maier & Neustadt

[57] ABSTRACT

A soft magnetic thin film according to the invention has an atomic ratio composition represented by the formula:

$$Fe_{(100-a-b)}M_aO_b$$

wherein M is at least one element selected from Group 3A elements and Group 4A elements, $2 \leq a \leq 15$ and $4 \leq b \leq 35$. It has a high saturation magnetic flux density Bs, high magnetic permeability $\mu$, low coercive force Hc, improved frequency response, high electric resistivity $\rho$, and good corrosion resistance.

7 Claims, 2 Drawing Sheets

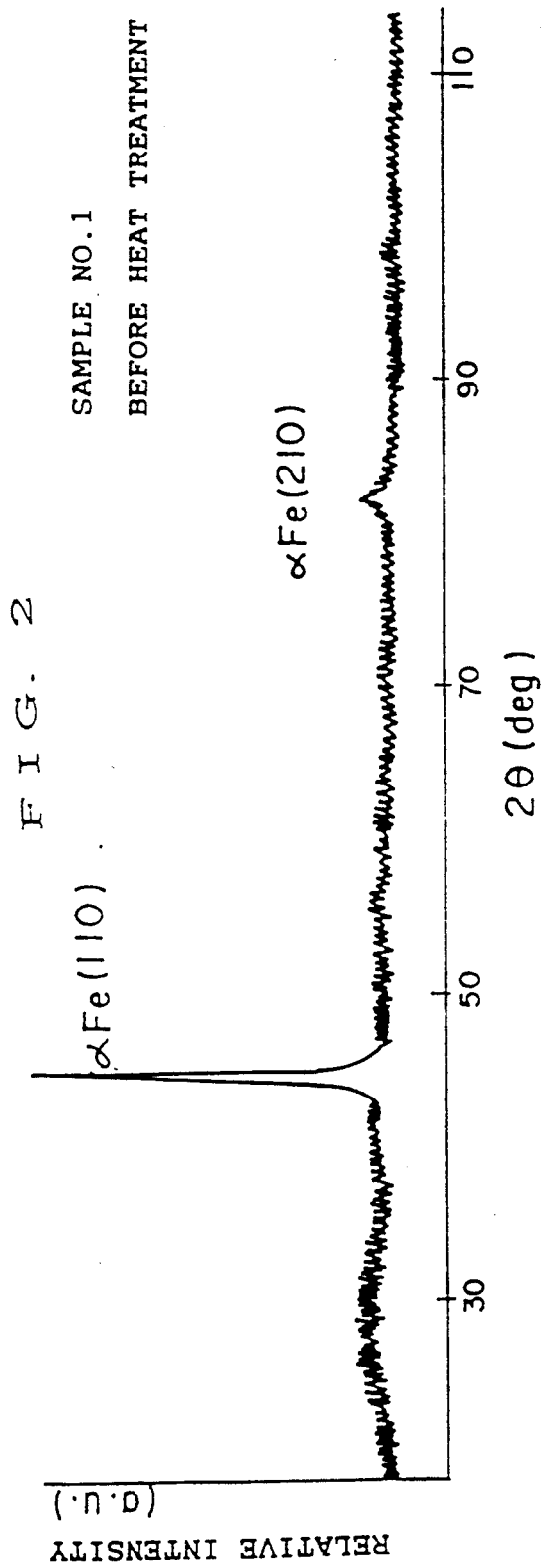
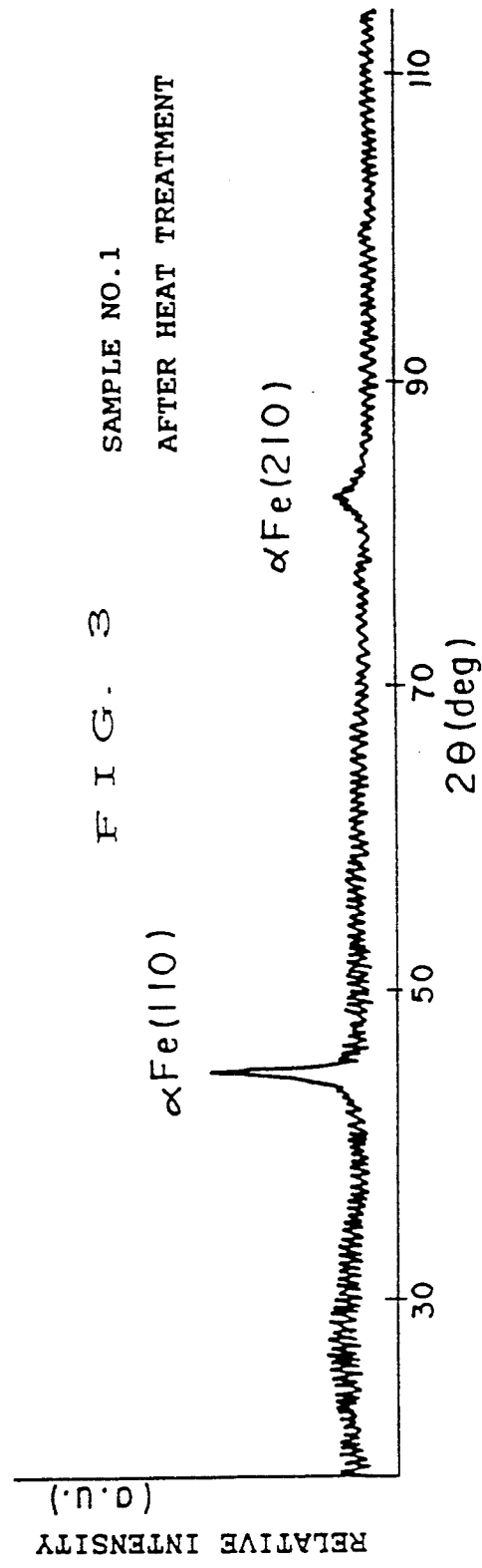

SOFT MAGNETIC THIN FILM

This invention relates to a soft magnetic thin film, and more particularly, to a soft magnetic thin film for use in high density recording magnetic heads and thin film inductors.

BACKGROUND OF THE INVENTION

Sendust, Permalloy and various other soft magnetic materials are known as materials for forming soft magnetic thin films for use in magnetic heads and thin film inductors.

In the magnetic recording field, for example, magnetic recording media having a higher coercive force Hc are desired in accordance with an increase in magnetic recording density. To achieve satisfactory recording in magnetic recording media having high coercive force, magnetic heads are required to generate high density magnetic flux. As a consequence, soft magnetic thin films for magnetic heads are required to have higher saturation magnetic flux density Bs.

In addition, for high recording/reproducing sensitivity, soft magnetic thin films are desired to have a high magnetic permeability $\mu$. Moreover, for improved frequency response of magnetic permeability $\mu$, high electric resistivity $\rho$ is preferred.

However, Sendust and Permalloy have insufficient saturation magnetic flux density Bs to provide acceptable writing in high coercivity magnetic recording media having a coercive force as high as 1400 Oe or more.

Multi-layer films comprising alternately stacked soft magnetic thin layers of different types are known to have high saturation magnetic flux density and magnetic permeability, but they have not scored a commercial success because of an increased number of steps, complexity to manufacture, and low production yield.

OBJECT OF THE INVENTION

An object of the present invention is to provide a soft magnetic thin film having a high saturation magnetic flux density Bs, high magnetic permeability $\mu$, high resistivity $\rho$, and good corrosion resistance.

SUMMARY OF THE INVENTION

This and other objects of the present invention are achieved according to the present invention by a soft magnetic thin film having an atomic ratio composition represented by the formula:

$$Fe_{(100-a-b)}M_aO_b$$

wherein M is at least one element selected from Group 3A elements and Group 4A elements, $2 \leq a \leq 15$ and $4 \leq b \leq 35$.

The soft magnetic thin film of the invention has a high saturation magnetic flux density Bs, high magnetic permeability $\mu$, and high electric resistivity $\rho$. The soft magnetic thin film of the invention is applicable to form magnetic heads, which can write information in high coercivity magnetic recording media in a satisfactory manner with high recording/reproducing sensitivity and improved high-frequency response.

Japanese Patent Application Kokai No. 22403/1989 discloses "a soft magnetic thin film comprising a majority of Fe, up to 20 at % of at least one member selected from the group consisting of Ti, Zr, V, Nb, Ta, Cr, Mo, W, Mn, Ru, Os, Co, Ni, B, C, Al, Si, Ga, Ge, Sn, P, and Sb, and 0.005 to 3 at % of oxygen." However, such films with an oxygen content of less than 4 at % have too low magnetic permeability $\mu$ to provide satisfactory soft magnetic properties and their electric resistivity $\rho$ is unsatisfactory.

BRIEF DESCRIPTION OF THE DRAWINGS

FIG. 2 is a graph showing the X-ray diffraction chart of a soft magnetic thin film of the present invention prior to heat treatment.

FIG. 3 is a graph showing the X-ray diffraction chart of a soft magnetic thin film of the present invention subsequent to heat treatment.

DETAILED DESCRIPTION OF THE INVENTION

Figure 1:
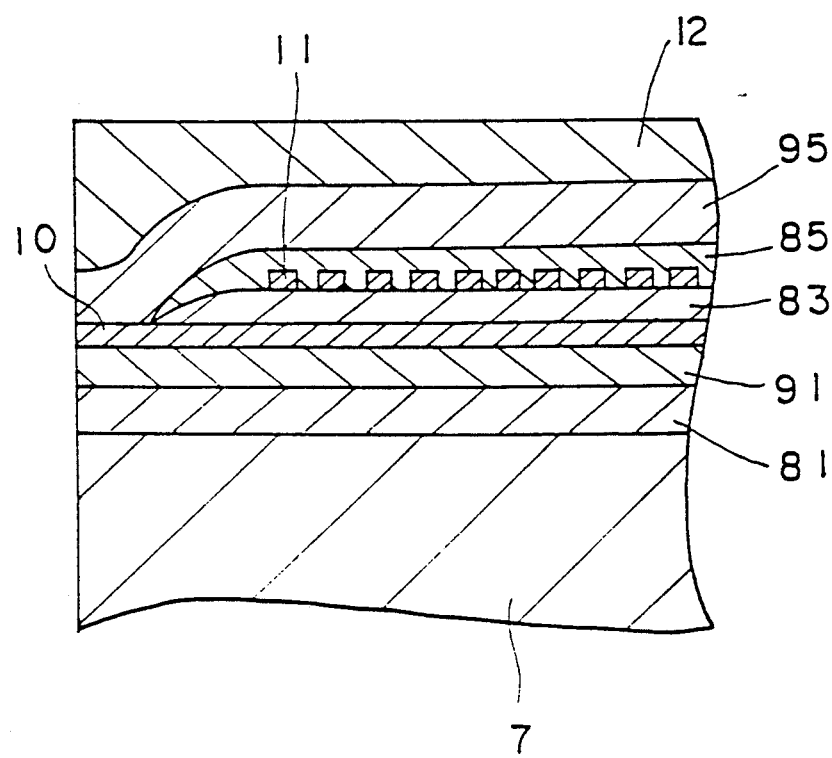
FIG. 1 is a fragmental cross section of one exemplary thin film magnetic head to which the soft magnetic thin film of the present invention is applied.

The organization of the present invention will be described in more particularity.

The soft magnetic thin film of the present invention has an atomic ratio composition of the following formula.

$$Fe_{(100-a-b)}M_aO_b$$

In the formula, M is at least one element selected from Group 3A elements and Group 4A elements.

Preferred examples of the Group 3A elements are Y, La and Ce and preferred examples of the Group 4A elements are Ti, Zr, and Hf, both alone or a mixture thereof. At least one element selected from Y, Hf and Zr is more preferred because of film quality improvements in denseness, adhesion strength, stability, and internal stress. Best preferred among them is Y because of low Hc, high $\mu$, good magnetic properties, high $\rho$, and good high frequency response.

Letter a is in the range of from 2 to 15, preferably from 3 to 13, more preferably from 4 to 11. Below the range, the coercive force Hc becomes too high to provide satisfactory magnetic permeability $\mu$. Beyond the range, the saturation magnetic flux density Bs lowers to below 12 kG.

Letter b is in the range of from 4 to 35, preferably from 7 to 28, more preferably from 9 to 21. Below the range, the coercive force Hc becomes too high to provide satisfactory soft magnetic properties. Beyond the range, the saturation magnetic flux density Bs lowers to below 12 kG and the coercive force Hc becomes too high to provide satisfactory soft magnetic properties.

As the case may be, carbon and/or nitrogen may substitute for part of oxygen. In such a case, the content of oxygen is preferably at least 50 at %, more preferably at least 80 at %, most preferably 90 to 100 at % based on the total of oxygen, nitrogen and carbon.

The presence of excess oxygen contributes to improvements in $\rho$ and high-frequency response.

The composition of the soft magnetic thin film of the invention may be determined by electron probe microanalysis (EPMA), for example. The soft magnetic thin film is generally about 0.3 to about 5 $\mu$m thick although the exact thickness may be suitably chosen for a particular application.

The soft magnetic thin film of the invention generally has a main magnetic phase based on Fe and an oxide phase based on oxides of M. It is to be noted that grains of the oxide phase are difficult to detect by ordinary X-ray diffraction analysis because they are extremely fine.

The main magnetic phase is composed of crystalline grains based on Fe. The crystalline grains may consist solely of Fe or consist of Fe and M or oxygen in solid solution therewith.

The oxide phase is generally composed of oxides of M although inclusion of nitrides and carbides of M is acceptable. The oxides of M are usually present in the form of most stable oxides with or without some deviation from their stoichiometry.

Crystalline grains of the main magnetic phase preferably have a mean grain diameter D of up to 1,000 Å. Beyond the limit, it seems difficult to reduce anisotropic dispersion and consequently, coercive force Hc is increased too much to provide soft magnetic properties. More preferably, the mean grain diameter D is up to 300 Å, especially from 20 to 300 Å. Especially high magnetic permeability $\mu$ is obtained from this preferred range. Further, corrosion resistance is high with a mean grain diameter D of up to 1,000 Å, especially up to 300 Å. Higher corrosion resistance is obtained where Y is contained as M due to the synergistic effect by the corrosion resistance of Fe-Y alloy itself.

The mean grain diameter D of crystalline grains is determined by measuring the half-value width $W_{50}$ of an $\alpha$-Fe (110) peak in a diagram by a powder method of X-ray diffraction, and calculating according to Scherrer formula:

$$D = 0.9\lambda / W_{50} \cos \theta$$

wherein $\lambda$ is the wavelength of X-ray used and $\theta$ is a diffraction angle. It is to be noted that the $2\theta$ of the $\alpha$-Fe (110) peak is 44.4 degrees.

Also preferably, crystalline grains of the main magnetic phase occupy at least 50%, especially at least 80% by volume of the entire material. As the proportion of the main magnetic phase is reduced, coercive force Hc is increased too much to provide soft magnetic properties and saturation magnetic flux density Bs is lowered. The volume proportion of the main magnetic phase may be determined, for example, from the volume ratio of an amorphous phase to a fine crystalline phase precipitated in the matrix as observed under a transmission electron microscope.

The soft magnetic thin film of the present invention may be formed by various gas phase methods, for example, evaporation, sputtering, ion plating, and chemical vapor deposition (CVD). The substrate on which a film is formed is cooled with water during film formation. Substrate temperatures of up to 200° C. are preferred because higher temperatures allow crystalline grains of the main magnetic phase and oxide phase to grow in the soft magnetic thin film. Since it is not critical how to cool the substrate, film may be formed on the substrate which is water cooled, for example.

The soft magnetic thin film may be formed by sputtering in the following manner, for example. The target is a cast alloy or sintered alloy while multiple source targets may also be used.

In order to introduce oxygen in the film, reactive sputtering in an oxygen atmosphere is effective or an oxide target may be used. Sputtering is carried out in an atmosphere of Ar or another inert gas. In the case of reactive sputtering, oxygen may be contained in an amount of about 0.2 to 2.5% by volume.

The mode of sputtering is not particularly limited. The sputtering apparatus used is not particularly limited and may be a conventional one. The operating pressure is generally about $3-30 \times 10^{-3}$ Torr for RF sputtering and about $1.5-2.5 \times 10^{-4}$ Torr for ion beam sputtering. The other parameters may be properly determined for a particular sputtering mode.

The film as formed may be either amorphous or crystalline, that is, crystalline grains may be present. Since M has high affinity to oxygen, heat of formation of M oxides during film deposition causes self heat treatment of the film, resulting in improved soft magnetic properties.

Preferably, the soft magnetic thin film is heat treated in order to further improve its soft magnetic properties. The preferred heat treating conditions are given below.

Heating rate: about 2°-10° C./min.

Holding temperature: about 200°-550° C., preferably about 300°-450° C.

Holding time: about 5-100 minutes

Cooling rate: about 2°-20° C./min.

Atmosphere: vacuum of up to $1 \times 10^{-4}$ Torr or inert gas such as Ar

In the present invention, M oxides finely dispersed in the matrix restrains crystalline grains from growing during heat treatment so that the mean grain diameter D may fall within the above-defined range.

The soft magnetic thin films thus obtained preferably have a coercive force Hc of up to 4 Oe, more preferably up to 3 Oe as measured with DC to about 50 Hz. The initial magnetic permeability $\mu i$ at 5 MHz is at least 600, especially at least 700. If the coercive force Hc exceeds the range or the initial magnetic permeability $\mu i$ is below the range, the films tend to lower recording/reproducing sensitivity when applied to magnetic heads. Further, the soft magnetic thin films have a saturation magnetic flux density Bs of at least 12 kG, especially at least 14 kG. Below the limit, overwrite ability is adversely affected and recording of high coercivity magnetic recording media becomes difficult.

Moreover, the soft magnetic thin films have an electric resistivity of at least $100 \times 10^{-6}$ $\Omega$-cm, especially at least $130 \times 10^{-6}$ $\Omega$-cm. Therefore, the soft magnetic thin films of the invention, for example, thin films of 2 $\mu$m thick having a $\mu i$ of about 2,000, maintain their $\mu i$ unchanged up to a frequency of about 13 MHz, that is, provide high magnetic permeability at high frequencies.

The measurements of Bs, Hc, $\mu i$, and $\rho$ are as follows.

Bs: using a vibrating sample magnetometer (VSM) in a magnetic field of 10 kOe

Hc: using a thin film historoscope $\mu i$: using an impedance analyzer to measure the inductance in a magnetic field of 3 mOe at a frequency of 5 MHz $\rho$: using a four terminal method to measure sheet resistance The soft magnetic thin films of the present invention are applicable to a variety of magnetic heads, typically thin film magnetic heads.

FIG. 1 illustrates an exemplary preferred flying magnetic head of the thin film type to which the present invention is applied. The thin film magnetic head shown in FIG. 1 includes a slider or base 7, an insulating layer 81, a lower pole layer 91, a gap layer 10, an insulating layer 83, a coil layer 11, an insulating layer 85, an upper pole layer 95, and a protective layer 12 stacked in this order.

The slider 7 may be formed from any well-known materials including ceramics and ferrites. Examples of ceramic materials include $Al_2O_3$-TiC base ceramic materials, $ZrO_2$ base ceramic materials, SiC base ceramic materials, and AlN base ceramic materials. They may contain an additional component(s) such as Mg, Y, $ZrO_2$, and $TiO_2$. The shape and dimensions of the slider 7 may be of conventional design and suitably chosen for a particular application.

The insulating layer 81 is formed on the slider 7. The insulating layer 81 may be formed of any conventional well-known materials. For example, $SiO_2$, glass, $Al_2O_3$ and the like may be used if it is desired to form such layers by sputtering. The thickness and pattern of the insulating layer 81 may be of conventional design, and it is about 5 to 40 μm thick, for example.

The magnetic poles are generally provided in the form of lower and upper pole layers 91 and 95 as illustrated in FIG. 1. According to the invention, the lower and upper pole layers 91 and 95 are soft magnetic thin films having an atomic ratio composition of the formula defined herein. The resulting magnetic head has improved overwrite property and high recording/reproducing sensitivity, especially at high frequencies with respect to high coercivity magnetic recording media.

The magnetic pole layers 91 and 95 may be of conventional well-known design with respect to their pattern, thickness and the like. The lower magnetic pole layer 91 may be about 1 to 5 μm thick and upper magnetic pole layer 95 may be about 1 to 5 μm thick, for example.

The gap layer or spacer 10 intervenes between the lower and upper pole layers 91 and 95. The gap layer 10 may be formed from any well-known materials including $Al_2O_3$ and $SiO_2$. The gap layer 10 may be of conventional well-known design with respect to its pattern, thickness and the like. It may be about 0.2 to 1.0 μm thick, for example.

The coil layer 11 may be formed from any desired material, generally from a metal such as Al and Cu. No particular limits are imposed on the pattern and density of the coil. The coil may be wound in a well-known conventional manner. For example, the coil pattern may be of the spiral type illustrated in FIG. 1, laminate type or zigzag type. The coil layer 11 may be formed by gas phase deposition techniques such as sputtering or plating techniques.

In the illustrated embodiment, the coil layer 11 is spirally disposed between the lower and upper pole layers 91 and 95 while the insulating layers 83 and 85 intervene between the coil layer 11 and the lower and upper pole layers 91 and 95, respectively. These insulating layers 83 and 85 may be formed from any well-known materials, for example $SiO_2$, glass, and $Al_2O_3$ when it is desired to form the thin films by sputtering.

The protective layer 12 is present on the upper pole layer 95. The protective layer 12 may be formed from any well-known materials, for example, $Al_2O_3$. The protective layer 12 may be of conventional well-known design with respect to its pattern, thickness and the like. It may be about 10 to 50 μm thick, for example. An additional resinous coating may be laminated, if desired.

Briefly stated, the process for producing such a thin film type magnetic head includes thin film formation and patterning. To form thin films which constitute the respective layers as described above, any well-known vapor phase deposition techniques such as vacuum evaporation and sputtering, and plating techniques may be used. The respective layers of the thin film magnetic head may be patterned by selective etching or selective deposition, which are both well known in the art. The etching may be either wet or dry etching.

The thin film magnetic head to which the invention is applied is usually combined with well-known members such as an arm to form a head assembly. Using the thin film magnetic head as far described, various modes of overwrite recording can be carried out.

The soft magnetic thin films of the present invention are applicable to various magnetic heads such as metal-in-gap (MIG) heads as well as the thin film magnetic heads described above.

Since satisfactory magnetic properties are available through heat treatment at temperatures as low as about 300° C., the soft magnetic thin films of the present invention can also be formed on polymeric films of polyimides or the like and thus applicable as thin film inductors.

BENEFITS OF THE INVENTION

There have been described soft magnetic thin films which have improved soft magnetic properties of high saturation magnetic flux density Bs, high magnetic permeability $\mu$, and low coercive force Hc as well as high electric resistivity $\rho$. The films are well corrosion resistant. Since the films can provide these properties in a single-layer form, film formation is simple and they are effectively produced on a mass production scale in high yields.

The soft magnetic thin films of the invention are applicable to magnetic heads which ensure satisfactory recording on high coercivity magnetic recording media with improved overwrite ability. In addition, recording/reproducing sensitivity, especially at high frequencies is significantly improved over the prior art heads.

EXAMPLE

Examples of the present invention are given below by way of illustration.

Example 1

Using an RF sputtering apparatus, Fe-Y-O soft magnetic thin films of about 1 μm thick having the atomic ratio compositions shown in Table 1 were formed on substrates.

First, chips of Y were symmetrically arranged on a pure iron target. A substrate was spaced 55 mm from the composite target. Sputtering was carried out in a gas mixture of Ar and $O_2$. The substrate was crystallized glass (Photoserum by Corning Glass) and maintained at 100° C. or lower by indirect water cooling.

Main film-forming parameters are given below.

Sputtering gas: Ar+0.1 vol % $O_2$ to Ar+2.5 vol % $O_2$

Sputtering gas pressure: $5 \times 10^{-3}$ Torr

Input power: 2.4 W/cm²

Film forming rate: 160 Å/min.

Vacuum reached: $1 \times 10^{-6}$ Torr

Then, the films were heated treated at a vacuum of $1 \times 10^{-6}$ Torr and a temperature of 400° C. for a holding time of one hour for improving their magnetic properties before they were examined by the following tests.

(1) Film composition

A film was specially formed on a 99.85% purity aluminum substrate to determine its composition by EPMA method.

(2) Initial magnetic permeability ($\mu i$)

It was determined by placing a ferrite yoke in abutment against the film surface and measuring the inductance in a magnetic field of 3 mOe at a frequency of 5 MHz using an impedance analyzer.

(3) Coercive force (Hc)

It was measured using a thin film historoscope.

(4) Saturation magnetic flux density (Bs)

It was measured in a magnetic field of 10 kOe using a VSM.

(5) Electric resistivity ($\rho$)

It was determined by measuring sheet resistance by a four terminal method.

(6) Mean diameter of crystalline grains (D)

It was determined from the half-value width of an $\alpha$-Fe (110) peak in X-ray diffractometry.

(7) Crystalline grain content

It was determined from the volume ratio of an amorphous phase to a fine crystalline phase precipitated in the matrix using a transmission electron microscope.

For comparison purposes, an Fe-Si-Al soft magnetic thin film of 1 $\mu$m thick was formed on a glass substrate in the same manner as above except that an alloy target of the composition: $Fe_{74}Si_{18}Al_8$ (at %) was used and sputtering was conducted in Ar. The film was heat treated at a vacuum of $1 \times 10^{-6}$ Torr and a temperature of 600° C. for a holding time of one hour and then examined for various properties as above. The results are shown in Table 1.

restraining $\alpha$-Fe crystalline grains from growing by annealing, though not exactly understood.

Equivalent results were obtained when up to 50 atom % of O was replaced by N or C by conducting reactive sputtering in a gas mixture of $N_2+O_2$, or by using carbon chips as auxiliary targets.

Example 2

Fe-Hf-O soft magnetic thin films were prepared using an ion beam sputtering apparatus.

First, chips of Hf were symmetrically arranged on a pure iron target to form a composite target. Using an ion beam sputtering apparatus having a bucket type ion gun with a diameter of 100 mm, Ar ions were accelerated and impinged against the target. Film of about 1 $\mu$m thick were formed on substrates spaced a predetermined distance from the target. Reactive sputtering was carried out by introducing a minor amount of oxygen into the vacuum chamber in proximity to the substrate. The substrates were crystallized glass and subject to indirect water cooling as in Example 1. Main film-forming parameters are given below.

Accelerating voltage: 1,200 V
Beam current: 130 mA
Film forming rate: 160 Å/min.
Vacuum reached: $1 \times 10^{-7}$ Torr
Vacuum during film formation: $1.5-2.5 \times 10^{-4}$ Torr Then, the films were heated treated at a vacuum of $1 \times 10^{-6}$ Torr and a temperature of 400° C. for a holding

TABLE 1

| Sample No. | Composition* (at %) | $\mu i$ (5 MHz) | Hc (Oe) | Bs (kG) | $\rho$ ($\times 10^{-6}$ $\Omega$-cm) | D (Å) | Grain content (vol %) |
|---|---|---|---|---|---|---|---|
| 1 (Invention) | $Fe_{79.0}Y_{6.5}O_{20.4}$ | 2320 | 0.6 | 14.5 | 197 | 140 | 100 |
| 2 (Invention) | $Fe_{78.3}Y_{9.2}O_{12.5}$ | 1550 | 1.2 | 15.5 | 148 | 130 | 100 |
| 3 (Comparison) | $Fe_{87.3}Y_{9.9}O_{2.8}$ | $\approx 0$ | 32.1 | 16.2 | 108 | 80 | 86 |
| 4 (Comparison) | $Fe_{74}Si_{18}Al_8$ | 1800 | 0.5 | 10.2 | 80 | >1000 | 100 |

*Sample Nos. 1-3: composition after heat treatment
Sample No. 4: composition of the target The benefits of the present invention are evident from the data of Table 1.

On measurement of $\mu i$ at a frequency of from 1 to 20 MHz, sample Nos. 1 and 2 showed a constant $\mu i$ over 1 to 10 MHz and only a little drop in $\mu i$ at 20 MHz. In addition, sample Nos. 1 and 2 were well corrosion resistant.

FIG. 2 illustrates the X-ray diffraction chart of sample No. 1 prior to heat treatment, and FIG. 3 illustrates the X-ray diffraction chart of sample No. 1 subsequent to heat treatment.

The soft magnetic thin film of the present invention (sample No. 1) showed a sharp (110) peak of $\alpha$-Fe immediately after its formation, but the (110) peak of $\alpha$-Fe was lowered by holding in vacuum at 400° C. for one hour, indicating that the growth of crystalline grains did not occur. It is believed that finely dispersed $Y_2O_3$ undetectable by X-ray diffractometry is effective in time of one hour for improving their magnetic properties before they were examined for various properties by the same tests as in Example 1. The results are shown in Table 2.

TABLE 2

| Sample No. | Composition (at %) | $\mu i$ (5 MHz) | Hc (Oe) | Bs (kG) | $\rho$ ($\times 10^{-6}$ $\Omega$-cm) | D (Å) | Grain content (vol %) |
|---|---|---|---|---|---|---|---|
| 5 (Invention) | $Fe_{79.4}Hf_{5.2}O_{15.4}$ | 980 | 2.0 | 16.1 | 148 | 170 | 100 |
| 6 (Invention) | $Fe_{85.7}Hf_{5.0}O_{9.3}$ | 900 | 2.3 | 17.0 | 142 | 140 | 100 |
| 7 (Comparison) | $Fe_{92.1}Hf_{5.2}O_{2.7}$ | $\approx 0$ | 12.1 | 17.9 | 102 | 90 | 96 |

The benefits of the present invention are evident from the data of Table 2.

Example 3

Fe-Zr-O soft magnetic thin films of 1 $\mu$m thick were formed on glass substrates by the same procedure under the same conditions as in Example 2 for the formation of Fe-Hf-O soft magnetic thin films. The target used was a composite target obtained by symmetrically arranging chips of Zr on a pure iron target. Heat treatment used the same conditions as in Example 2. The soft magnetic thin films were examined for various properties by the same tests as above. The results are shown in Table 3.

TABLE 3

| Sample No. | Composition (at %) | μi (5 MHz) | Hc (Oe) | Bs (kG) | ρ (× 10⁻⁶ Ω-cm) | D (Å) | Grain content (vol %) |
|---|---|---|---|---|---|---|---|
| 8 (Invention) | $Fe_{74.8}Zr_{10.7}O_{14.5}$ | 1050 | 1.8 | 14.6 | 164 | 150 | 100 |
| 9 (Invention) | $Fe_{81.6}Zr_{6.1}O_{12.3}$ | 730 | 2.6 | 16.3 | 138 | 140 | 100 |
| 10 (Comparison) | $Fe_{92.1}Zr_{6.5}O_{1.4}$ | ≈0 | 14.5 | 18.0 | 83 | 90 | 97 |

The benefits of the present invention are evident from the data of Table 3.

Equivalent results were obtained when Fe-M-O soft magnetic thin films were prepared using various metals selected from Groups 3A and 4A elements and examined as above.

The soft magnetic thin films of the present invention were applied to magnetic heads to manufacture thin film magnetic heads. The heads were used to carry out recording and reproducing operations on high coercivity magnetic recording media, finding improved electromagnetic properties including satisfactory overwrite ability and high recording/reproducing sensitivity at high frequencies.

We claim:

1. A soft magnetic thin film having an atomic ratio composition represented by the formula:

$$Fe_{(100-a-b)}M_aO_b$$

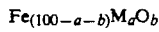

wherein M is at least one element selected from the group consisting of the elements Sc, Y, La, Ac, Ce, Th Ti, Zr, Hf, Pr, and Pa, $2 \leq a \leq 15$ and $4 \leq b \leq 35$ wherein said soft magnetic thin film has a coercive force Hc of up to 4 Oe as measured with DC to about 50 Hz.

2. The soft magnetic film of claim 1 wherein said film comprises a main magnetic phase and an oxide phase, said main magnetic phase being based on Fe, and crystalline grain of said main magnetic phase having a mean grain diameter D of up to 1,000 Å.

3. The soft magnetic thin film of claim 1 wherein part of oxygen is replaced by N and/or C.

4. A magnetic head comprising magnetic pole layers wherein said pole layers comprise the soft magnetic thin film of claim 1.

5. The soft magnetic thin film of claim 2 wherein part of oxygen is replaced by N and/or C.

6. The soft magnetic thin film of claim 2 having a main magnetic phase based on Fe, crystalline grains of the main magnetic phase occupying at least 50% by volume of the entire film.

7. The soft magnetic thin film of claim 6, wherein part of oxygen is replaced by N and/or C.

* * * * *